Figure 1:
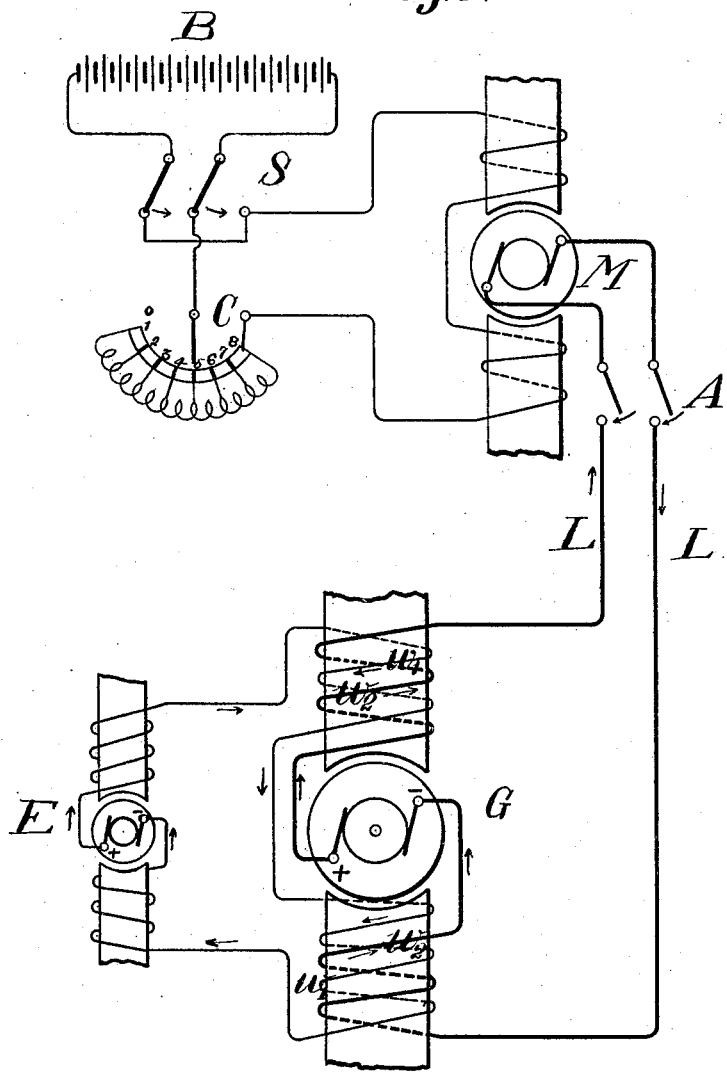

No. 755,853. PATENTED MAR. 29, 1904.
M. DÉRI.
ELECTRIC POWER TRANSMISSION SYSTEM.
APPLICATION FILED MAY 28, 1902.
NO MODEL. 5 SHEETS—SHEET 1.

Witnesses:
Lynn A. Williams
Harvey L. Hanson

Inventor:
Max Déri,
By Charles A. Brown & Cragg.
Attorneys.

No. 755,853. PATENTED MAR. 29, 1904.
M. DÉRI.
ELECTRIC POWER TRANSMISSION SYSTEM.
APPLICATION FILED MAY 28, 1902.
NO MODEL. 5 SHEETS—SHEET 4.

Witnesses:
Charles J. Schmidt
Leonard W. Novander

Inventor.
Max Déri
By Charles A. Brown
Atty.

No. 755,853. PATENTED MAR. 29, 1904.
M. DÉRI.
ELECTRIC POWER TRANSMISSION SYSTEM.
APPLICATION FILED MAY 28, 1902.
NO MODEL. 5 SHEETS—SHEET 5.

Witnesses: Inventor
Charles J. Schmidt Max Déri
Lynn A. Williams By Charles A. Brown
Attorney.

No. 755,853. Patented March 29, 1904.

UNITED STATES PATENT OFFICE.

MAX DÉRI, OF VIENNA, AUSTRIA-HUNGARY, ASSIGNOR TO STANLEY ELECTRIC MANUFACTURING COMPANY, A CORPORATION OF NEW JERSEY.

ELECTRIC-POWER-TRANSMISSION SYSTEM.

SPECIFICATION forming part of Letters Patent No. 755,853, dated March 29, 1904.

Application filed May 28, 1902. Serial No. 109,309. (No model.)

*To all whom it may concern:*

Be it known that I, MAX DÉRI, engineer, a subject of the Emperor of Austria-Hungary, residing at Vienna, in the Empire of Austria-Hungary, have invented certain new and useful Improvements in Electric-Power-Transmission Systems; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to electric-power-transmission systems, and has for its object improved means for controlling the operation thereof.

More particularly, my invention has for its object means whereby the power-generator and the motor receiving power are caused to automatically and mutually control each other to insure an economical operation and regulation of the power-generator and also to insure the safe operation of the motor supplied thereby without the use of main-line resistance, particularly when the motor is to be started or reversed.

My invention is particularly adaptable to traction systems—as, for example, street-railway systems—where the motor must operate through a wide range of torque and must bear rough usage, particularly when it is desired to suddenly start and stop the car driven thereby, and a special feature of my invention includes means whereby a considerable amount of energy with corresponding low voltage can be made available for starting, stopping, and reversing the motor. The regulation and control are accomplished by my improved method of operating the power-generator, the magnetic excitation of which is so arranged that the voltage of the generator varies inversely with the current. When the current strength is at its maximum, the voltage drops to zero or may even assume a negative value. A motor driven by such generator can therefore be connected directly therewith from a state of rest or non-excited condition without the intervention of resistance, and while running it can have a reverse electromotive force imparted to it without injury.

I shall more clearly describe my invention by reference to the accompanying drawings, in which—

Figure 2:
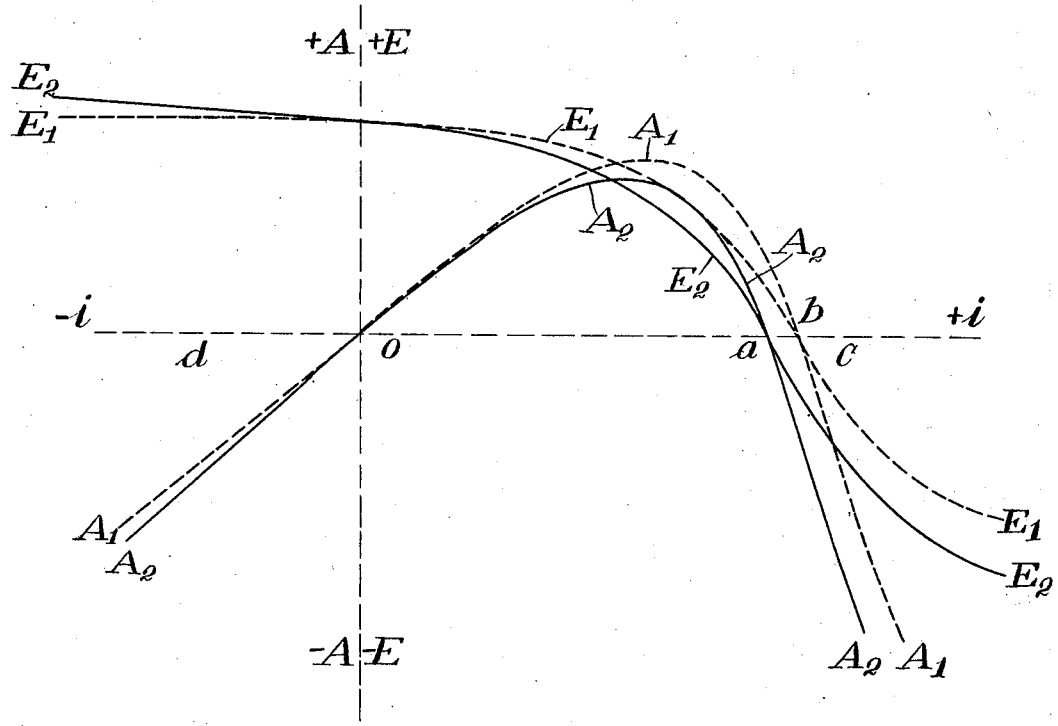
Figure 3:
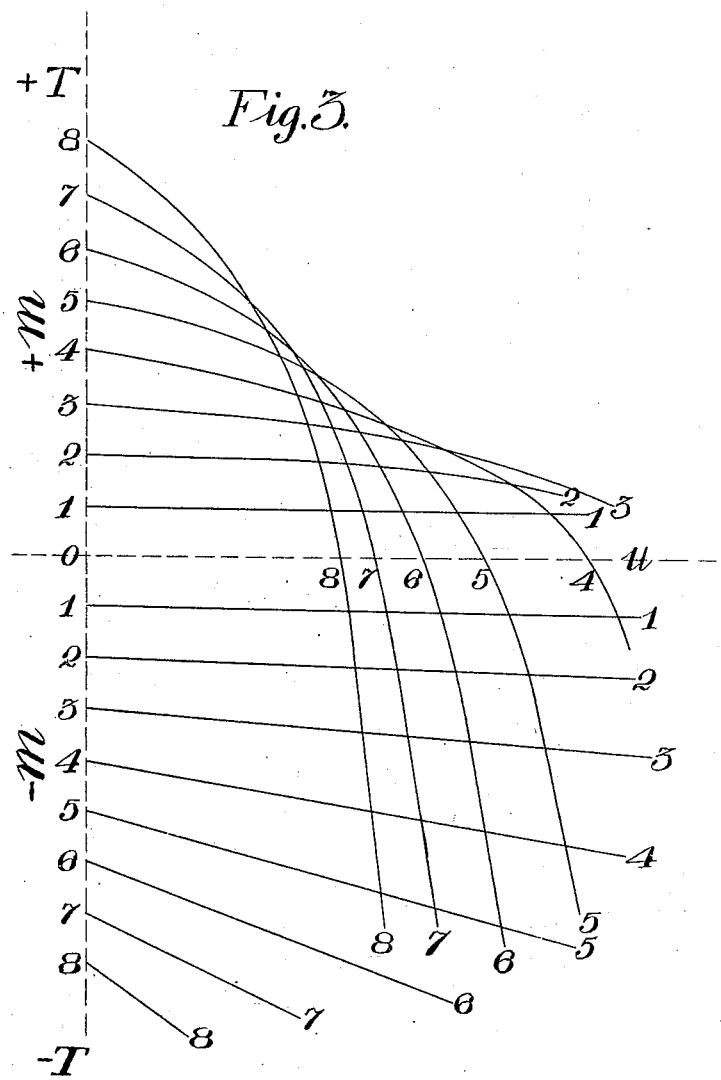
Figure 4:
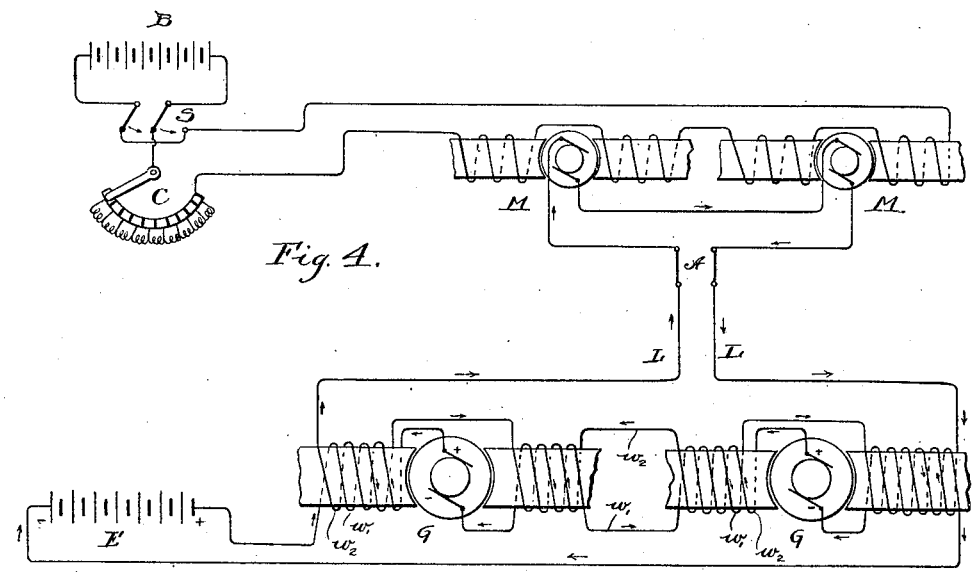
Figure 7:
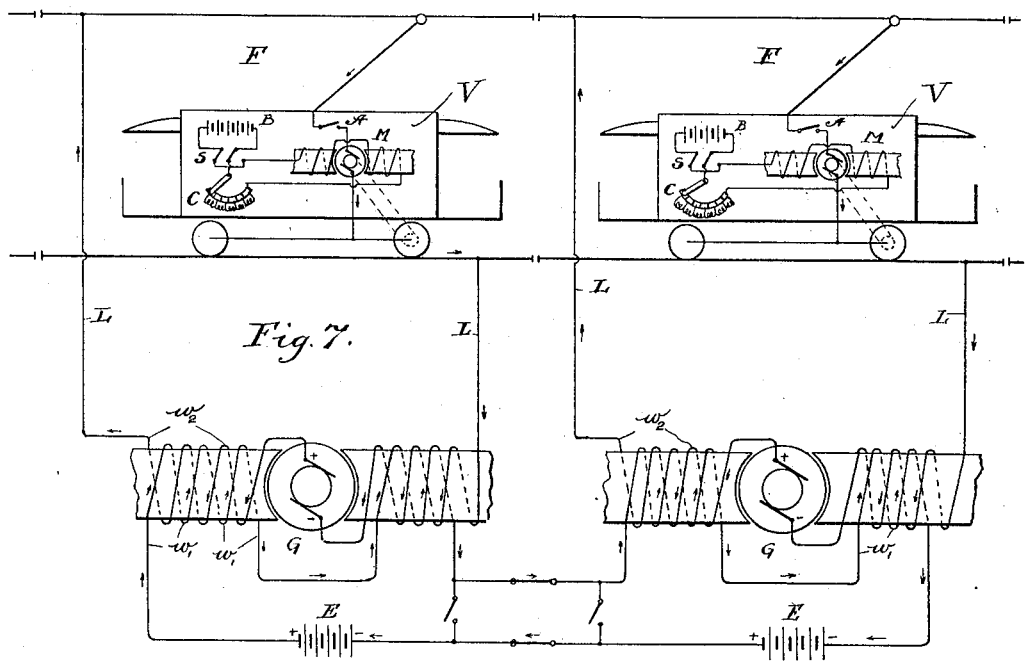
Figure 5:
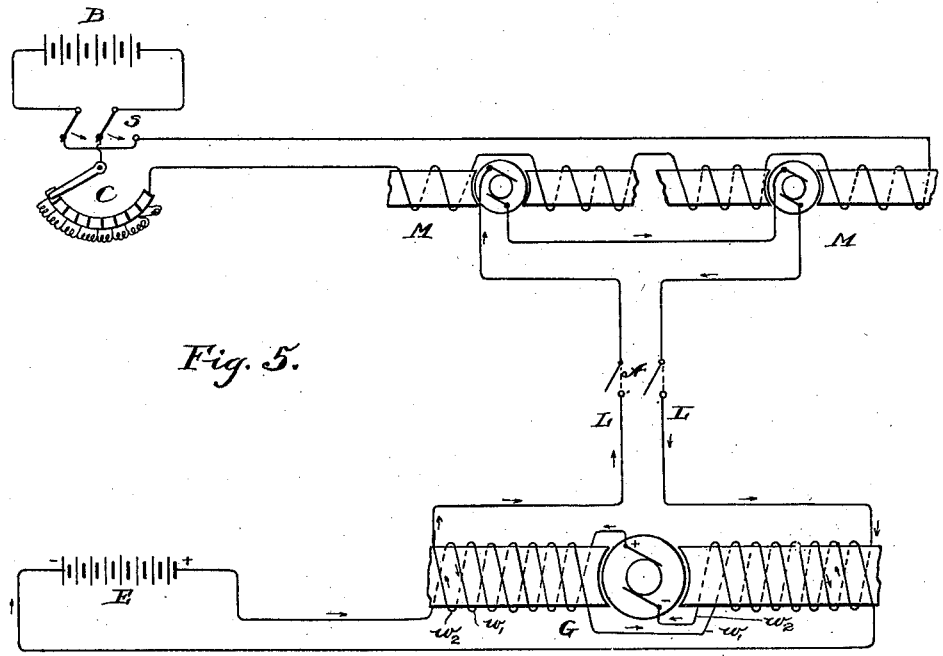
Figure 6:
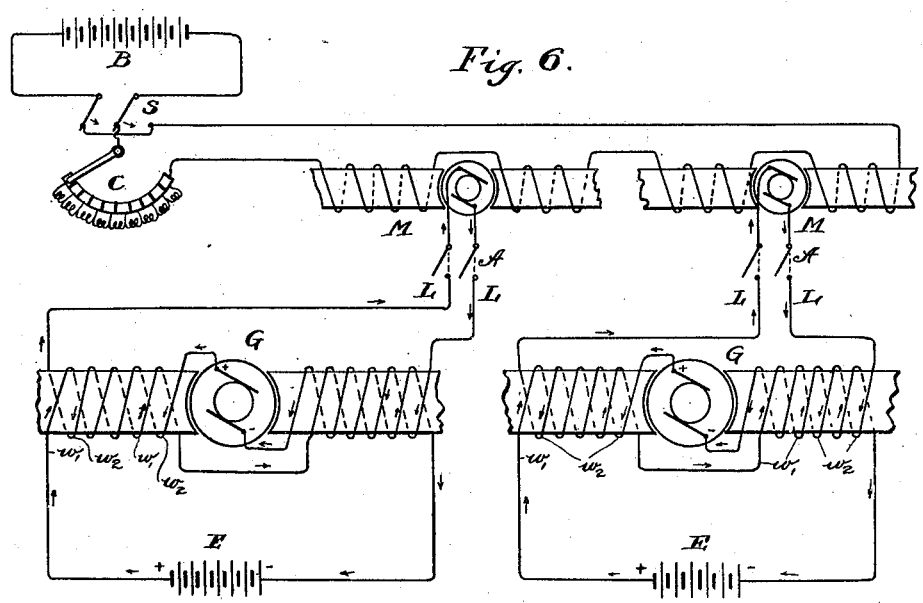

Figure 1 is a diagrammatic view of the generator and motor arranged in accordance with my invention. Fig. 2 is a graphical representation of the relations of pressure, current, and energy. Fig. 3 is a graphical representation of the relations of torque to speed of rotation of the motor. Figs. 4, 5, and 6 show a modified use of generators and motors arranged in accordance with my invention. Fig. 7 shows another modified arrangement, the motors being utilized to propel vehicles.

Like characters of reference indicate like parts throughout the several figures.

A generator G supplies current through a transmission-line L L to a motor M, adapted for direct connection thereto by means of a switch A. The motor may be employed to drive machinery or the like or to propel a vehicle or car V, as shown in Fig. 7. I preferably connect the armature and field-winding $W^2$ of generator G in series and in series relation with the line L L. An exciter E supplies current to an additional field-winding $W'$ on generator G, so disposed that its magnetizing effect is in opposition to that created by winding $W^2$, the tendency of winding $W'$ being, preferably, to excite the field-poles of generator G to a high degree of saturation.

The motor M may be self-excited by well-known means or may be separately excited—as, for example, by a battery B, adapted for connection with the field-winding of the motor through a reversing-switch S, a rheostat resistance C being included in the exciting-circuit.

The operation is now apparent. Suppose generator G in operation and excited by exciter E, through winding $W'$, switch A open, and rheostat C out of circuit. Switch A may now be closed and motor M connected directly to the line L. Rheostat C is then adjusted to give the proper starting torque and after that an average torque best suited for the ordinary work required of the motor M.

As the winding $W^2$, in circuit with the line L L and motor M, is wound in opposition to the winding $W'$, injurious rise of current will be checked when switch A is suddenly closed.

In Fig. 2 curve $E'$ $E'$ shows the voltage at the generator, and $E^2$ $E^2$ the corresponding voltage at the motor, both in relation to the variable working-current value shown by line $i$ $i$. The motor-field remaining constant, the motor speed will automatically vary inversely with the current. This will be the condition when the motor runs under ordinary conditions. If it is now desired to stop, the motor-field is brought to zero by switch S and is then excited to a greater or less degree in a reverse direction, according as the braking action required is to be gradual or sudden. $E^2$ is thus reversed, and as it increases in reverse value $E'$ also becomes zero and becomes reversed, the pressures changing their relations to each other, $E^2$ becoming greater than $E'$, motor and generator counteracting each other to brake motor M. Before the motor comes to rest the motor-field is brought to zero, or if it is desired to continue in a reverse direction reverse excitation is maintained.

In Fig. 2 curve $A'$ $A'$ represents the energy delivered by the generator G and curve $A^2$ $A^2$ that consumed by the motor, both in relation to the current strength represented on line $i$ $i$. It will be seen that $A^2$ becomes zero when $i$ equals zero and when $i$ equals $o$ $a$ and that the greatest energy value does not occur with the greatest current strength, but with a current strength between these values of zero and $o$ $a$ at a point near $a$. Consequently at this point the greatest torque will be obtained with corresponding low voltage. With $i$ negative and $i$ greater than $o$ $a$ $A^2$ is of negative value, and consequently in both these cases retarding or braking of the motor will occur also with corresponding low voltage, and the car may be braked or stopped, as above described.

When the motor is employed to propel a vehicle or car V and the car is running down an incline or is coasting, motor M will act as a generator. $i$ will be of negative value. $E'$ and $E^2$ will increase, but will only slightly exceed a value corresponding to zero current. Both pressures remain positive in this case, but change their relation, $E^2$ becoming greater than $E'$, current consequently flowing back to the generator. The speed of the car in this case is controlled by the amount of excitation allowed by resistance C to motor M, now running as a generator.

As the working pressure of motor M has only a small value when the rheostat C is opened, it is advantageous to connect or disconnect motor M from the line L L at such position of C. During short intervals, however, it is not necessary to interrupt the circuit, because the unexcited motor requires very little energy, as seen by the value of $A'$ when $E^2$ is zero.

In Fig. 2 I have graphically shown the value of the motor torque T corresponding to the speed of rotation U. The ratio between these two factors and work performed may be definitely determined for a given field strength. By the variation of this field strength the working energy can be regulated without reducing the economy, because opposite variation of torque and speed or, in other words, current and voltage will always adjust themselves automatically.

In the coördinate diagram in Fig. 3 I have shown eight different curves for positive value of the motor-field $+m$ and the same number of curves for negative values of the motor-field $-m$. The positive ordinates indicate the tractive force $+T$, and the negative ordinates represent the braking forces $-T$, the latter forces occurring both when the motor runs at a great speed with positive field and when the motor has its magnetism reversed while running to cause braking.

For simplicity I have described my invention in connection with only one generator and one motor; but it may also be adaptable where several motors or several generators are used, as shown in Figs. 4, 5, and 6. In such cases all the machines in one group should be excited and regulated in common, so that variation in field strength may take place simultaneously. The herein-described method of transmitting power can also be applied to installations in which several generators or motors work independently of each other—for example, in extensive railway systems. In this case the installation is divided into several sections F F, insulated from each other, as shown in Fig. 7.

Where installations have two or more lines in which trains cross each other, sections of rail should be insulated from each other in lengths, according to the amount of traffic, in order that there may be but one train running at the same time on any section. Each section may be separately supplied continuously or periodically by an independent generator the excitation of which is effected, as hereinbefore described, in order that the regulation thereof and of the motor on each train may be caused independently of the others.

While I have herein shown and particularly described the preferred embodiment of my invention, I do not wish to limit myself to the precise construction and arrangement herein shown; but, Having described my invention, I claim as new and desire to secure by Letters Patent—

1. In a system of electrical power transmission, the combination of a motor, a series generator in circuit with said motor, a separately-excited field-winding on said generator wound in opposition to the series winding thereon, and means whereby the field-winding of said motor may be separately and adjustably excited, substantially as described.

2. In a system of electrical power transmission, the combination of a series generator, a separately-excited field-winding on said generator wound in opposition to the series field-winding thereon, a motor having its armature included in series with said series field-winding on said generator, and means for controlling the current through the field-winding of said motor, substantially as described.

3. In a system of electrical power transmission, the combination of a series generator, a separately-excited field-winding on said generator wound in opposition to the series field-winding thereon, a motor having its armature included in series with said series field-winding on said generator, means for adjusting a current through the field-winding of said motor, and means for reversing said current, substantially as described.

4. In a system of electrical power transmission, the combination of a series generator, a separately-excited field-winding on said generator wound in opposition to the series field-winding thereon, a motor having its armature included in series with said series field-winding on said generator, and having a separately-excited field-winding, substantially as described.

5. In a system of electrical power transmission, the combination of a series generator, a separately-excited field-winding on said generator wound in opposition to the series field-winding thereon, a motor having its armature included in series with said series field-winding on said generator and having a separately-excited field-winding, means for adjusting the current through said motor field-winding, and means for reversing said current, substantially as described.

6. In a system of electrical power transmission, the combination with a generator having field-poles constantly magnetized in one direction, and a self-excited field-winding wound to oppose said direction, of a motor in electrical connection therewith, and means whereby said motor may be separately excited, substantially as described.

7. In a system of electrical power transmission, the combination with a generator having field-poles constantly magnetized in one direction and a self-excited field-winding wound to oppose said direction, of a plurality of motors in electrical connection therewith, said motors being separately excited and controlled in common, substantially as described.

8. In a system of electrical power transmission, the combination with a generator having field-poles constantly magnetized in one direction and a self-excited field-winding wound to oppose said direction, of a motor in electrical connection therewith, means whereby said motor may be separately excited, means whereby the exciting-current may be reversed, and means whereby said current may be adjusted, substantially as described.

9. In a system of electrical transmission, the combination of a generator having a separately-excited field-winding and an oppositely-wound series winding through which the main current may flow, a motor having an armature included in series with said series winding on said generator, and a separate adjustable exciting means for said motor whereby the operative condition of said motor may be varied thereby to vary the main current flowing through said series winding on said generator, whereby the electromotive force of said generator may be varied to control the operation of said motor, substantially as described.

10. In a system of electrical power transmission, the combination of a plurality of motors, an independent series generator in circuit with each motor, a separately-excited field-winding on each of said generators wound in opposition to the series winding thereon, and means whereby the field-windings of said motors may be separately and adjustably excited in common, substantially as described.

11. In a system of electrical power transmission, the combination of a plurality of motors, means whereby the field-windings of said motors may be separately excited in common, an independent series generator in circuit with each motor, an additional field-winding on each of said generators wound in opposition to the series winding thereon, and external means whereby said additional field-windings may be excited in common, substantially as described.

12. In a system of electrical power transmission, the combination of a plurality of motors, means whereby said motors may be excited in common from an external source, a plurality of series generators in circuits with said motors, an additional field-winding on each of said generators wound in opposition to the series winding thereon, and external means whereby said additional field-windings may be excited in common, substantially as described.

13. In a system of electrical power transmission, the combination with a plurality of motors excited in common from a separate source, of a plurality of series generators in connection therewith, said generators being excited in common from a separate source in opposition to the excitation caused by the series windings thereon, substantially as described.

In testimony that I claim the foregoing as my invention I have signed my name in presence of two subscribing witnesses.

MAX DÉRI.

Witnesses:
ALVESTO S. HOGUE,
AUGUST FUGGER.